(12) United States Patent
Coudray et al.

(10) Patent No.: US 6,334,755 B1
(45) Date of Patent: Jan. 1, 2002

(54) TURBOMACHINE INCLUDING A DEVICE FOR SUPPLYING PRESSURIZED GAS

(75) Inventors: Xavier Gérard André Coudray, Chagny; Mischaël François Louis Derrien, Mouy/Seine; Marc Roger Marchi, Le Mee; Philippe Christian Pellier, Melun; Jean-Claude Christian Taillant, Vaux le Penil; Thierry Henri Marcel Tassin, Brunoy; Christophe Bernard Texier, Melun; Isabelle Marie Monique Valente, Suresnes, all of (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/506,685

(22) Filed: Feb. 18, 2000

(51) Int. Cl.⁷ ................................. F01D 5/14
(52) U.S. Cl. ................. 415/115; 415/176; 415/178
(58) Field of Search ................. 415/115, 116, 415/176, 178, 180, 179

(56) References Cited

U.S. PATENT DOCUMENTS 3,647,313 A * 3/1972 Koff ........................... 415/115
3,844,110 A * 10/1974 Widlansky et al. ........ 60/39.08
5,271,711 A    12/1993 McGreehan et al.
5,472,313 A * 12/1995 Quinones et al. ............ 415/115

FOREIGN PATENT DOCUMENTS

EP    0 806 544    11/1997
GB    836952       6/1960

* cited by examiner

*Primary Examiner*—Edward K. Look
*Assistant Examiner*—Ninh Nguyen
(74) *Attorney, Agent, or Firm*—Oblon, Spivak, McClelland, Maier & Neustadt, P.C.

(57) ABSTRACT

The invention provides a turbomachine including a device for supplying pressurized gas, the gas being bled from the compressor of the turbomachine via a bleed orifice and cooled in a cooling cavity disposed within the compressor rotor upstream of the bleed orifice. This arrangement has the effect of cooling the bled gas by heat transfer through the outer wall of the compressor rotor to the gas stream which is being compressed by the compressor upstream of the bleed orifice, and has the result of reducing the drop in the performance of the compressor as a result of the gas being bled off.

8 Claims, 1 Drawing Sheet

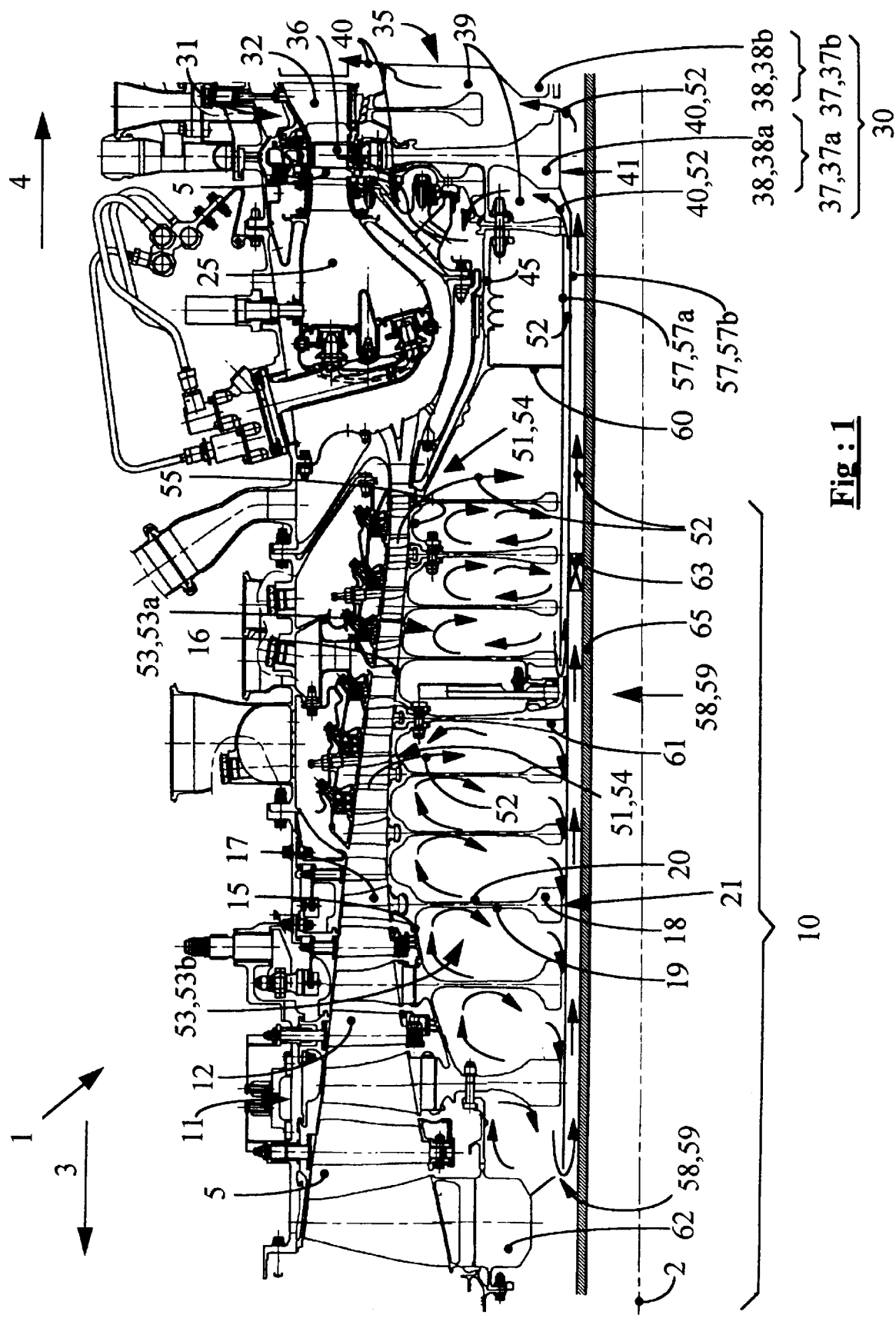
Fig:1

TURBOMACHINE INCLUDING A DEVICE FOR SUPPLYING PRESSURIZED GAS

BACKGROUND OF THE INVENTION

1. Field of the Invention

The invention relates to turbomachines, particularly but not exclusively to turbomachines for aircraft, and more specifically to turbomachines including at least one device which bleeds gas from the compressor of the turbomachine to provide a supply of pressurized gas. The invention also relates to the application of this device to the cooling of the rotor of the turbine of the turbomachine.

2. Summary of the Prior Art

Turbomachines are well known machines which essentially comprise a rotary compressor with vanes, a combustion chamber and a turbine, the stream of gas which passes through them from the upstream end to the downstream end being subjected to an appropriate thermodynamic cycle. Turbomachines are used in particular in aeronautics for aircraft propulsion, and are also used in industry. They often include at least one device for supplying pressurized and somewhat cold gas intended for various uses, such as cooling parts such as the turbine, controlling operating clearances, heating the fuel or the lubricant, and aircraft auxiliaries.

Such a device for supplying pressurized gas customarily includes means for bleeding gas from the compressor at a desired pressure, means for cooling the gas thus bled to a desired temperature, and means for conveying this gas to the items which will use it.

The means for bleeding the gas from the compressor comprises at least one bleed orifice opening into the gas stream and arranged at a point in the compressor where the pressure has reached a sufficient level.

The means for cooling the bled gas essentially comprises a heat exchanger connected to the bleed orifice by a pipe. The heat exchanger consists of a cooling cavity which has an inlet and an outlet and which is bordered over an adequate area by a cooling surface in contact with a coolant fluid, the bled gas brushing against the cooling surface while passing through the cooling cavity from the inlet to the outlet. The coolant fluid may be ambient air, blown if necessary, but may equally be the lubricant or the fuel, which then acts as a heat-transfer fluid which has to be cooled itself, this most often being done using other coolers in contact with the ambient air.

The gas is then led to the items which are to use it by pipes. Cooling the turbine rotor is more tricky. The rotor disks usually have a radial cavity extending into each blade. The duct conveying the gas to the radial cavity passes through the center of the turbomachine near its axis of rotation and may consist of the turbine shaft itself.

Such devices for supplying pressurized gas exhibit numerous drawbacks. Firstly, bleeding gas from the compressor reduces the performance of the compressor, which has a direct impact on the thermodynamic performance of the turbomachine. Secondly, cooling the bled gas requires coolers which are placed outside the machine, these coolers generating drag in the case of turbine engines for aircraft. When use is made of an intermediate heat-transfer fluid; such as the lubricant or the fuel, effective regulation needs to be in place in order not to run the risk of carbonizing this heat-transfer fluid as a result of excessive heating. Finally, cooling the turbine rotor requires a complex and cumbersome circuit, part of which has to pass through the center of the turbomachine and interfere with the turbine shaft.

SUMMARY OF THE INVENTION

The invention addresses two problems, the first being that of reducing the fall in compressor performance, and the second being that of simplifying and lightening the cooling of the turbine rotor.

As a solution to the first problem the invention provides a turbomachine including a rotary compressor having an upstream end, a downstream end and means defining a flow path therebetween through which a stream of gas is compressed as it passes from said upstream end to said downstream end, said compressor including vanes disposed in said flow path and a compressor rotor having an outer wall which is contacted by said stream of gas as it flows along said flow path, and a pressurized gas supply device comprising a gas bleed orifice disposed in said rotary compressor and opening into said flow path thereof, and a cooling cavity disposed within said compressor rotor for cooling the pressurized gas bled from said gas stream via said gas bleed orifice, said cooling cavity comprising an inlet connected to said gas bleed orifice, an outlet, and a cooling surface for contact by said pressurized gas bled from said gas stream as said pressurized gas passes from said inlet to said outlet, said cooling surface being formed at least partly by at least a portion of the outer wall of said compressor rotor upstream of said gas bleed orifice whereby said bled pressurized gas is cooled by heat transfer through said outer wall of said compressor rotor to said gas stream upstream of said gas bleed orifice.

This arrangement has the result of returning to the gas stream, in the compressor, some of the energy which is bled off, thus reducing the drop in compressor performance resulting from the gas being bled off.

It will be understood that the transfer of heat from the bled gas back into the gas stream is made possible by the fact that this heat exchange takes place upstream of the gas bleed orifice, that is to say in a zone of the compressor where the gas stream is at a lower temperature than the temperature it has in the region of the bleed orifice. This exchange is made efficient by the presence of the rotor blades, which receive, by thermal conduction, some of the heat which is transferred to the outer wall of the compressor rotor, these blades returning the heat to the stream of gas by virtue of their large surface area which is swept at high speed by the gas flowing in the stream.

It will be understood that the cooling surface has to be large enough to allow the bled gas to be cooled, the person skilled in the art determining said heat-exchanger surface area according to the characteristics of the turbomachine, the point at which the gas is bled off, and the flow rate and temperature of the pressurized gas to be supplied.

The invention has the advantage of being simple to implement and of mainly using existing means, thus making it possible to reduce the mass and cost of the turbomachine.

Preferably, the cooling surface extends overall from downstream to upstream, that is to say that the bled gas sweeps the cooling surface from downstream to upstream. This arrangement has the effect of bringing the bled gas against zones of the cooling surface which, on the whole, are increasingly colder, and has the result of achieving a greater drop in the temperature of the bled gas. This arrangement also has the advantage of returning the heat to the gas stream uniformly along the compressor, which allows the operation of the compressor not to be disturbed.

It will be understood that all that is required in order to obtain the effect sought by the invention is for the flow of the bled gas in contact with the cooling surface to be generally in the direction from downstream to upstream. This effect will be maintained in spite of limited returns of bled gas in the downstream direction, it being possible for such returns to result from mechanical or aerodynamic constraints.

Preferably, the bleeding of gas is centripetal, the bleed orifice being located in the outer wall of the compressor rotor. This arrangement has the effect of shortening the path that the bled gas has to follow from the bleed orifice to the inlet of the cooling cavity, and has the result of allowing a short connection. In a preferred embodiment, the bleed orifice also constitutes the inlet to the cooling cavity, that is to say the bleed orifice opens directly into said cavity.

The turbomachine may have a plurality of cooling cavities in the compressor rotor, so as to be able to supply bled gas to different receivers and more or less independently of each other. In other words, the flow rate of pressurized gas supplied by one cooling cavity will have only a small influence on the temperature of the pressurized gas supplied by another cooling cavity.

The cooling cavities will preferably be arranged in the upstream-downstream direction, so as simultaneously to supply bled gas under different pressure and temperature conditions. Thus, a cooling cavity located toward the upstream end of the compressor will supply pressurized gas at a temperature and at a pressure which are lower than those for gas supplied by a cooling cavity nearer the downstream end of the compressor.

In the case of a turbomachine including a turbine having a rotor which is coaxial with the compressor and located downstream of said compressor and which is arranged to be cooled by the centrifugal passage of a flow of gas, the turbomachine is preferably provided with a tube disposed coaxially with the compressor and with the turbine, the upstream end of this tube being connected to the outlet of the cooling cavity and the downstream end of the tube being connected to the turbine rotor that is to be cooled. The function of this tube is to bring the bled pressurized gas directly to the turbine rotor from the cooling cavity, passing from upstream to downstream through the center of the turbomachine, that is to say near its geometric axis. This very simple arrangement makes it possible to make use of the central region of the turbine engine which is usually underused. It also allows the cooling gas to be conveyed through a straight short pipe of large cross section, which will minimize pressure drops.

Preferably, in the case of a turbine rotor with at least two stages, first and second stages A and B will be connected each to a respective one of first and second cooling cavities A and B by a respective one of first and second tubes A and B, the first turbine stage A being upstream of the second stage B, the first cooling cavity A being downstream of the second cooling cavity B, and the second tube B passing through the inside of the first tube A. An arrangement of this kind has the effect of conveying of the bled gases from the cooling cavities to the respective turbine stages that are to be cooled in the manner of concentric flows which do not cross, the flow of bled gas from the second cooling cavity B being conducted along the inside of the flow of bled gas from the first cooling cavity A. This arrangement thus allows the various flows of bled gas to be conveyed simply, and without crossing, from the cooling cavities which produced them to the turbine stages that are to be cooled. The arrangement also makes it possible to supply the various turbine stages with bled gas under temperature conditions suited to each stage: a stage located nearer the downstream end of the turbine, which is therefore not as hot, receiving bled gas from a cooling cavity located nearer the upstream end of the compressor, which is therefore also less hot. Finally, the arrangement makes it possible to maintain large passage cross sections which do not introduce pressure drops in the flow of bled gas.

The present invention is particularly effective when the compressor rotor is of the disk type, because the disks penetrate into the cooling cavity and increase the cooling surface area, which has the effect of increasing the ability of the cooling cavity to cool the bled gas.

BRIEF DESCRIPTION OF THE DRAWING

FIG. 1 shows a partial view, in cross section, of a twin-spool turbine engine for an aircraft, said engine having two devices A and B for supplying pressurized gas in accordance with the invention.

DESCRIPTION OF THE PREFERRED EMBODIMENT

The drawing shows part of a turbomachine 1 which, on the whole, is generally symmetrical about a longitudinal axis 2 and through which a gas stream 5 passes from the upstream end 3 to the downstream end 4. The gas stream 5 passes first of all through a rotary compressor 10 including a stator 11 which externally bounds the flow path for the gas stream 5 though the compressor and which supports a plurality of stationary vanes 12. The compressor 10 also includes a compressor rotor 15 which rotates about the longitudinal axis 2 and has an outer wall 16 which internally bounds the gas stream flow path, the outer wall 16 supporting a plurality of turning vanes 17, often referred to as blades, which extend radially across the gas stream 5 and compress it in collaboration with the stationary vanes and the particular shape of the gas stream flow path. In order to withstand the centrifugal force produced by the rotation of the compressor rotor 15, a disk 18 secured at its periphery to the outer wall 16 of the compressor rotor 15 is arranged under each stage of turning vanes 17. Each disk 18 is disposed roughly in a plane which is radial with respect to the longitudinal axis 2, and defines two oppositely facing lateral flanks 19 and 20 and a central aperture 21.

The gas stream 5 then passes through a combustion chamber 25 where it experiences a significant rise in temperature, before entering and passing through a turbine 30.

The turbine 30 comprises a stator 31 externally bounding the flow path for the gas stream 5 through the turbine, the stator 31 supporting stationary vanes 32. The turbine 30 also comprises a rotor 35 which rotates about the axis 2 and, at its periphery, carries a plurality of turning vanes or blades 36 which extend radially across the gas stream flow path and receive some of the energy built up in said gas stream 5. The "mobile" turning vanes or blades 36 are distributed in two stages 37, namely an upstream stage 37a and a downstream stage 37b. Each stage 37 has a turbine disk 38 for withstanding the centrifugal force of rotation, and each turbine disk 38 has a radial cavity 39 allowing the centrifugal flow of a cooling gas 40 which is conducted through the center 41 of the disk 38 and passes radially through the turbine disk 38 and the turning vanes or blades 36.

The turbine 30 is coaxial with the compressor 10, and the turbine rotor 35 is connected to the compressor rotor 15 by a drive shaft 45, usually of large diameter.

In this example, the turbomachine 1 has two devices A and B for supplying pressurized gas, each being arranged inside the compressor rotor 15. Each pressurized gas supply device comprises a centripetal gas bleed orifice 51 arranged in the outer wall 16 of the rotor 15, and the gas bled off is referenced 52. The supply device also comprises a cooling cavity 53 inside the compressor rotor 15. The cooling cavity 53 uses the internal volume of the compressor rotor 15 and has an inlet 54 which, in this example, coincides with the gas bleed orifice 51. The cooling cavity 53 also has a cooling surface 55 formed at least partly by at least part of the outer wall 16 of the compressor rotor 15, this cooling surface 55 being located upstream 3 of the gas bleed orifice 51. The cooling cavity 53 is, in this example, bounded on the upstream 3 side by a disk 61 and internally by a tube which extends almost to the disk 61, the gap 58 left between the disk 61 and the tube 57 constituting the outlet from the cooling cavity 53. The cooling cavity 53 may have a varying number of disks 18 extending radially across it, the tube 57 passing through the central aperture 21 of each of these disks 18 with sufficient clearance 59 to allow the bled gas 52 to pass from the disk from downstream to upstream. The tube 57 extends in the downstream direction as far as the radial cavity 39 of a turbine disk 38 to which it is connected. In this example, the cooling cavity 53 is bounded at the downstream end by a downstream partition 60 of the compressor rotor 15, the downstream partition 60 being attached at its periphery to the outer wall 16 of the rotor downstream of the gas bleed orifice 51.

The way in which the assembly works is as follows. The stream of gas 5 passes through the compressor 10 from upstream to downstream, undergoing a compression which increases its temperature and pressure. Compressed, and therefore hot, gas 52 is bled from the gas stream 5 through the bleed orifice 51, passes through the cooling cavity 53 from its inlet 54 to its outlet 58 where it enters the tube 57, passes along the tube 57 to the radial cavity 39 of the turbine disk 38, moves out as far as the turning vanes or blades associated with the turbine disk 38, and finally returns to the gas stream 5, usually through cooling orifices, not shown, formed in the turning vanes or blades 36. As it passes through the cooling cavity 53, the bled gas 52 passes through the disks 18 via the clearances 59 between the central apertures 21 and the tube 57. During this passage, the bled gas 52 is swept in a complex swirling movement across the cooling surface 55 and the flanks 19 and 20 of the disks 18. Because the cooling surface 55 is upstream 3 of the bleed orifice 51, this cooling surface 55 and the turning vanes 17 attached to it are in contact with the gas stream 5 which is colder at this point than it is toward the bleed orifice 51. This allows heat to be transferred from the bled gas 52 to the gas stream 5, this heat passing through the disks 18 which extend across the cooling cavity 53, through the cooling surface 55, and at least partially through the turning vanes 17.

The relative arrangements of the two gas supply devices A and B will now be described. To do this, the letters a, b will be used in conjunction with the reference numerals used to indicate components of the devices as described above. The first gas supply device A comprises a cooling cavity 53a toward the downstream end of the compressor rotor 15, this cooling cavity 53a being connected by a tube 57a to the turbine disk 38a located at the upstream end of the turbine rotor 35. The second gas supply device B comprises a cooling cavity 53b connected by a tube 57b to the turbine disk 38b. The cooling cavity 53b is upstream of the cooling cavity 53a, the tube 57b passes through the inside of the tube 57a, and the turbine disk 38b is downstream of the turbine disk 38a.

The downstream cooling cavity 53a is bounded at the downstream end by a downstream partition 60 of the compressor rotor 15, this downstream partition 60 being connected at its outer periphery to the downstream end of the outer wall 16 of the compressor rotor 15, and being connected at its inner periphery to the tube 57a. The downstream cooling cavity 53a is bounded at its upstream end by a common disk 61 which has the edge of its central aperture 21 attached to the tube 57b. The attachments described may be achieved by any means which offers sufficient gastightness to the bled gas, having regard to the pressures reached inside the turbomachine.

The upstream cooling cavity 53b is bounded at its downstream end by the aforementioned common disk 61, and at its upstream end by the first disk 62 of the compressor 10.

The tubes 57a and 57b may be thin in order to reduce their mass, and preferably they will be connected together by spacer pieces 63 to make the assembly more rigid, said spacer pieces 63 obviously allowing the bled gas 52 to pass.

In this example, the invention is applied to the so-called "high-pressure" spool of a "twin-spool" turbomachine. The other, so-called "low-pressure", spool is not shown, but has a shaft 65 passing coaxially through the tube 57b to connect the "low-pressure" turbine to the "low-pressure" compressor.

The advantages of the present invention applied to the cooling of the turbine rotor should now be clearly apparent.

1) In comparison with turbine rotor cooling performed directly with uncooled bled gas, the invention allows the same cooling of the turbine rotor to be performed with a lower flow rate of gas, thus increasing the efficiency of the overall cycle of the turbomachine and thereby reducing its fuel consumption.

2) The method employed for cooling the bled gas leads to only a very small increase in the mass of the turbomachine, represented, in practice, by the mass of the tubes 57, in contrast to prior systems with separate and therefore heavier coolers. This advantage is significant in the field of aeronautics.

3) The cooler is intrinsic to the compressor rotor and therefore causes no aerodynamic braking of a turbomachine used for the propulsion of aircraft, unlike conventional coolers which are usually positioned in the turbomachine bypass flow and therefore degrade the total pressure of the flow and the thermodynamic efficiency of the turbomachine.

The present invention is not restricted to the particular example which has just been described, and is intended to cover all variations which may be conceived without departing either from its scope or spirit.

The turbomachine may be a single-spool or a multi-spool turbomachine, and the invention may be applied equally to any of the spools.

In this example, the turbomachine comprises a so-called "in-line" compressor. The present invention is also applicable to a turbomachine which has a centrifugal compressor or a hybrid compressor.

In this example, the bleed orifices 51 open directly into the cooling cavities 53 and are thus coincident with the inlets 54 of said cavities. However, the bleed orifices 51 could just as well be distinct from said inlets 54.

In this example, the turbomachine 1 comprises a compressor rotor 15 of the type having disks 18. The invention may also be applied to a turbomachine including a compressor rotor 15 without disks, and in this case partitions will be provided to axially bound the cooling cavities 53.

Finally, in this example, the term "stage" 37 is used in the strict sense and corresponds to a turbine disk 38 with its turning vanes or blades 36. In application of the invention, however, a stage 37 may encompass a number of turbine disks 38 and their associated vanes or blades 36, which will all be cooled together by one and the same flow of bled gas 52. A solution of this type is preferable because of its simplicity towards the downstream end of the turbine, where the temperature is lower.

What is claimed is:

1. A turbomachine including a rotary compressor having an upstream end, a downstream end and means defining a flow path therebetween through which a stream of gas is compressed as it passes from said upstream end to said downstream end, said compressor including vanes disposed in said flow path and a compressor rotor having an outer wall which is contacted by said stream of gas as it flows along said flow path, and a pressurized gas supply device comprising a gas bleed orifice disposed in said rotary compressor and opening into said flow path thereof, and a cooling cavity disposed within said compressor rotor for cooling the pressurized gas bled from said gas stream via said gas bleed orifice, said cooling cavity comprising an inlet connected to said gas bleed orifice, an outlet, and a cooling surface for contact by said pressurized gas bled from said gas stream as said pressurized gas passes from said inlet to said outlet, said cooling surface being formed at least partly by at least a portion of the outer wall of said compressor rotor upstream of said gas bleed orifice whereby said bled pressurized gas is cooled by heat transfer through said outer wall of said compressor rotor to said gas stream upstream of said gas bleed orifice wherein said cooling surface extends overall from downsteam to upstream, so as to bring said bled pressurized gas against increasingly cooler zones of said cooling surface.

2. The turbomachine as claimed in claim 1, wherein said gas bleed orifice is disposed in said outer wall of said compressor rotor so as to shorten the path that said bled pressurized gas has to follow between said gas bleed orifice and said inlet to said cooling cavity.

3. The turbomachine as claimed in claim 1, wherein said rotary compressor comprises a plurality of disks having a central opening communicating with said cooling cavity, each disk having two flanks which are bordered by said cooling cavity, whereby said bled pressurized gas passes through said central opening so as to cause said bled gas also to contact the entire surface of said flanks.

4. A turbomachine including a rotary compressor having an upstream end, a downstream end and means defining a flow path therebetween through which a stream of gas is compressed as it passes from said upstream end to said downstream end, said compressor including vanes disposed in said flow path and a compressor rotor having an outer wall which is contacted by said stream of gas as it flows along said flow path, and a pressurized gas supply device comprising a gas bleed orifice disposed in said rotary compressor and opening into said flow path thereof, and a cooling cavity disposed within said compressor rotor for cooling the pressurized gas bled from said gas stream via said gas bleed orifice, said cooling cavity comprising an inlet connected to said gas bleed orifice, an outlet, and a cooling surface for contact by said pressurized gas bled from said gas stream as said pressurized gas passes from said inlet to said outlet, said cooling surface being formed at least partly by at least a portion of the outer wall of said compressor rotor upstream of said gas bleed orifice whereby said bled pressurized gas is cooled by heat transfer through said outer wall of said compressor rotor to said gas stream upstream of said gas bleed orifice wherein a plurality of cooling cavities are provided in said compressor rotor and are arranged so as to supply bled pressurized gas to different receivers independently of each other.

5. The turbomachine as claimed in claim 4, wherein said plurality of cooling cavities are arranged in the upstream-downstream direction, so as simultaneously to supply bled pressurized gas under different pressure and temperature conditions.

6. A turbomachine including a rotary compressor having an upstream end, a downstream end and means defining a flow path therebetween through which a stream of gas is compressed as it passes from said upstream end to said downstream end, said compressor including vanes disposed in said flow path and a compressor rotor having an outer wall which is contacted by said stream of gas as it flows along said flow path, and a pressurized gas supply device comprising a gas bleed orifice disposed in said rotary compressor and opening into said flow path thereof, and a cooling cavity disposed within said compressor rotor for cooling the pressurized gas bled from said gas stream via said gas bleed orifice, said cooling cavity comprising an inlet connected to said gas bleed orifice, an outlet, and a cooling surface for contact by said pressurized gas bled from said gas stream as said pressurized gas passes from said inlet to said outlet, said cooling surface being formed at least partly by at least a portion of the outer wall of said compressor rotor upstream of said gas bleed orifice whereby said bled pressurized gas is cooled by heat transfer through said outer wall of said compressor rotor to said gas stream upstream of said gas bleed orifice wherein said turbomachine includes a turbine having a rotor coaxial with said rotary compressor and situated downstream of said compressor, and a tube disposed coaxially with said compressor and with said turbine, said tube having an upstream end connected to said outlet of said cooling cavity and a downstream end connected to the turbine rotor for conducting said bled pressurized gas directly from said cooling cavity to said turbine rotor through the center of said turbomachine to provide a centrifugal flow of cooling gas for said turbine rotor.

7. The turbomachine as claimed in claim 6, wherein said tube internally bounds said cooling cavity.

8. The turbomachine as claimed in claim 6, wherein said turbine rotor includes first and second stages connected each to a respective one of first and second cooling cavities by a respective one of first and second tubes, said first turbine stage being upstream of said second turbine stage, said first cooling cavity being downstream of said second cooling cavity, and said second tube passing through the inside of said first tube so as to convey first and second streams of bled pressurized gas to said first and second turbine stages in the form of concentric streams which do not cross.

* * * * *